(12) United States Patent
Bruggemann et al.

(10) Patent No.: US 11,204,285 B2
(45) Date of Patent: Dec. 21, 2021

(54) AIRCRAFT BRAKE TEMPERATURE MEASUREMENT

(71) Applicants: AIRBUS OPERATIONS LIMITED, Bristol (GB); AIRBUS OPERATIONS SAS, Toulouse (FR)

(72) Inventors: Kurt Bruggemann, Bristol (GB); Brice Cheray, Toulouse (FR)

(73) Assignees: Airbus Operations Limited, Bristol (GB); Airbus Operations SAS, Toulouse (FR)

( * ) Notice: Subject to any disclaimer, the term of this patent is extended or adjusted under 35 U.S.C. 154(b) by 38 days.

(21) Appl. No.: 16/773,254

(22) Filed: Jan. 27, 2020

(65) Prior Publication Data

US 2020/0158580 A1 May 21, 2020

Related U.S. Application Data

(62) Division of application No. 15/594,989, filed on May 15, 2017, now Pat. No. 10,564,050.

(30) Foreign Application Priority Data

May 16, 2016 (GB) ..................................... 1608598

(51) Int. Cl.
*G01K 11/24* (2006.01)
*F16D 66/00* (2006.01)
(Continued)

(52) U.S. Cl.
CPC ............. *G01K 11/24* (2013.01); *B64C 25/42* (2013.01); *B64D 45/00* (2013.01); *G01K 1/024* (2013.01);
(Continued)

(58) Field of Classification Search
CPC .......... G01K 11/24; G01K 1/024; G01K 1/14; G01K 13/08; B64C 25/42; B64D 45/00;
(Continued)

(56) References Cited

U.S. PATENT DOCUMENTS 4,241,603 A * 12/1980 Han ........................ F16D 55/40
188/1.11 L
4,249,642 A * 2/1981 Anderson ............... F16D 55/40
188/218 XL
(Continued)

FOREIGN PATENT DOCUMENTS

DE 40 06 885 10/1990
EP 1 148 266 10/2001
(Continued)

OTHER PUBLICATIONS

European Search Report cited in EP 17171165.8 dated May 29, 2018, 10 pages.
(Continued)

*Primary Examiner* — Nathaniel T Woodward
*Assistant Examiner* — Philip L Cotey
(74) *Attorney, Agent, or Firm* — Nixon & Vanderhye P.C.

(57) ABSTRACT

A brake temperature sensing system for an aircraft including a sensor apparatus and an interrogation apparatus. The sensor apparatus includes a temperature sensor for attachment to a brake disc of an aircraft brake, and a relay for attachment to the brake. The temperature sensor is configured to wirelessly transmit a measurement signal containing information relating to a temperature of the brake disc, responsive to receiving a wireless interrogation signal. The relay is configured to receive an interrogation signal from the interrogation apparatus; wirelessly transmit the interrogation signal to the temperature sensor; receive the wireless measurement signal from the temperature sensor; and trans-
(Continued)

mit the received measurement signal. The interrogation apparatus comprises a controller configured to generate an interrogation signal; and a transceiver configured to transmit the generated interrogation signal to the sensor apparatus; and receive the measurement signal transmitted by the sensor apparatus.

18 Claims, 7 Drawing Sheets

(51) Int. Cl.
*G01K 13/08* (2006.01)
*B64C 25/42* (2006.01)
*B64D 45/00* (2006.01)
*G01K 1/024* (2021.01)
*B60T 17/22* (2006.01)
*H04W 84/18* (2009.01)

(52) U.S. Cl.
CPC .............. *G01K 13/08* (2013.01); *B60T 17/22* (2013.01); *B64D 2045/0085* (2013.01); *F16D 2066/001* (2013.01); *H04W 84/18* (2013.01)

(58) Field of Classification Search
CPC ........... B64D 2045/0085; H04W 84/18; F16D 2066/001; B60T 17/22
See application file for complete search history.

(56) References Cited

U.S. PATENT DOCUMENTS

| | | | |
|---|---|---|---|
| 4,569,600 A * | 2/1986 | Preniczny | F16D 55/40 188/1.11 E |
| 4,658,936 A | 4/1987 | Moseley | |
| 5,172,960 A * | 12/1992 | Chareire | B60T 8/00 188/354 |
| 5,446,452 A | 8/1995 | Litton | |
| 5,651,430 A * | 7/1997 | Rancourt | B64C 25/36 188/1.11 L |
| 5,909,171 A * | 6/1999 | Kyrtsos | F16D 66/00 340/454 |
| 6,696,937 B1 | 2/2004 | Kiefer | |
| 8,087,824 B2 * | 1/2012 | Bingham | G01K 1/14 374/141 |
| 9,267,561 B2 | 2/2016 | Conway | |
| 9,415,757 B2 | 8/2016 | Martinotto et al. | |
| 9,796,364 B2 | 10/2017 | King | |
| 10,135,624 B2 | 11/2018 | Bill et al. | |
| 2002/0148690 A1 | 10/2002 | Wirth et al. | |
| 2002/0169231 A1 | 11/2002 | Okayama et al. | |
| 2003/0010582 A1 | 1/2003 | Denton et al. | |
| 2004/0011596 A1 | 1/2004 | Miller et al. | |
| 2004/0164140 A1 | 8/2004 | Voeller et al. | |
| 2006/0152074 A1 * | 7/2006 | Chico | B60T 8/1703 303/89 |
| 2006/0226698 A1 * | 10/2006 | Riebe | B60T 8/1703 303/20 |
| 2006/0238078 A1 | 10/2006 | Liu | |
| 2008/0092641 A1 * | 4/2008 | Cahill | B60T 8/52 73/121 |
| 2009/0213899 A1 * | 8/2009 | Bingham | G01K 1/146 374/141 |
| 2009/0243895 A1 | 10/2009 | Mitchell et al. | |
| 2010/0198472 A1 | 8/2010 | Kure et al. | |
| 2010/0207754 A1 | 8/2010 | Shostak et al. | |
| 2010/0250082 A1 | 9/2010 | King et al. | |
| 2011/0144879 A1 * | 6/2011 | Miller | G06Q 40/12 701/70 |
| 2011/0241866 A1 * | 10/2011 | Todd | B60T 17/22 340/453 |
| 2011/0276223 A1 | 11/2011 | Gowan et al. | |
| 2012/0007607 A1 | 1/2012 | Lowe et al. | |
| 2012/0296567 A1 * | 11/2012 | Breed | G01C 21/26 701/468 |
| 2013/0033381 A1 * | 2/2013 | Breed | B60T 7/16 340/568.1 |
| 2013/0131891 A1 | 5/2013 | Gowan et al. | |
| 2013/0230075 A1 | 9/2013 | Selles et al. | |
| 2014/0018978 A1 * | 1/2014 | Cahill | B60T 8/1703 701/3 |
| 2014/0060168 A1 | 3/2014 | Frank | |
| 2014/0198824 A1 | 7/2014 | Nagl et al. | |
| 2014/0311833 A1 * | 10/2014 | Martinotto | G01L 5/28 188/1.11 E |
| 2015/0013461 A1 | 1/2015 | Pollard et al. | |
| 2015/0112515 A1 | 4/2015 | Conway | |
| 2016/0090173 A1 | 3/2016 | Zabulon et al. | |
| 2017/0138423 A1 | 5/2017 | Kirkpatrick | |
| 2017/0259942 A1 | 9/2017 | Ziarno | |
| 2017/0307036 A1 | 10/2017 | Nuesser et al. | |

FOREIGN PATENT DOCUMENTS

| | | |
|---|---|---|
| EP | 2 642 149 | 9/2013 |
| EP | 2 777 998 | 9/2014 |
| JP | H05 667 | 1/1993 |
| JP | 9-240468 | 9/1997 |
| JP | 2010 064816 | 3/2010 |
| WO | 2007/005020 | 1/2007 |

OTHER PUBLICATIONS

European Search Report cited in EP 20204296.6 dated Feb. 5, 2021, 7 pages.

* cited by examiner

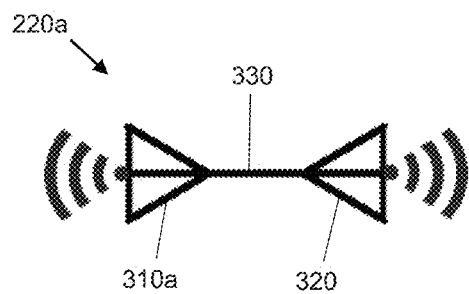
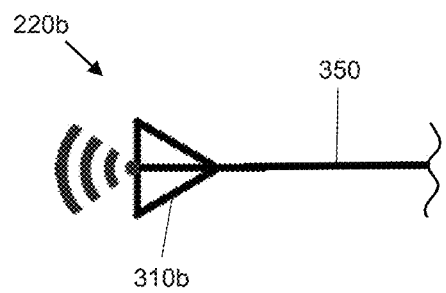
Fig. 3a
Fig. 3b
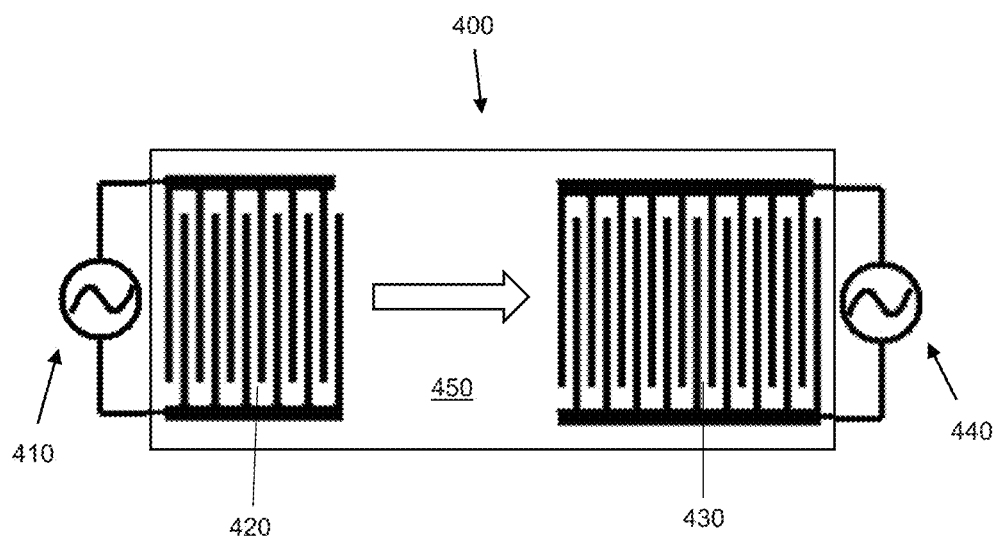
Fig. 4

001
AIRCRAFT BRAKE TEMPERATURE MEASUREMENT

RELATED APPLICATION

This application is a divisional of U.S. patent application Ser. No. 15/594,989, filed May 15, 2017, and claims priority to United Kingdom Patent Application GB 1608598.7 filed May 16, 2016, the entire contents of these applications are hereby incorporated by reference.

TECHNICAL FIELD

The present invention relates to a sensor apparatus for use in measuring the temperature of an aircraft brake.

BACKGROUND

Regulations require that an aircraft is able to perform a rejected take-off and stop before the end of the runway at any time before the decision speed (V1) for that aircraft is reached (V1 is the speed above which the take-off will continue even if an engine fails or another problem occurs). Elevated brake temperatures can decrease braking performance, thereby compromising the stop distance required leading to a potential runway overrun in case of a rejected take-off which is unacceptable. To manage this risk aircraft are prevented from dispatch and take-off unless actual brake temperatures are below a threshold which ensures braking performance is met in case of a rejected take-off.

Currently, the temperature of each brake pack on an aircraft is typically monitored using thermocouples placed in the brake torque tube. Several challenges exist in measuring brake temperatures using thermocouples. The brake design and operation (e.g. movement due to wear), and the operation and installation constraints of the thermocouples limit how robust the installation can be and how close to the hottest brake discs it is possible to place a thermocouple. For a robust installation of a thermocouple into the brake equipment, the most commonly used method is to install the thermocouple in the torque tube. However; this creates an air gap between the thermocouple and the brake discs. This air gap leads to thermal lag in the readings, and moreover the thermocouples may not be able to provide useable data until after a significant cooling period has elapsed. Additionally, the correlation between the thermocouple readings and the actual brake temperatures can vary depending on the brake design. These factors mean that significant safety margins are built into aircraft dispatch procedures, and as a consequence many aircraft may wait longer before take-off than is actually necessary.

An improved system for measuring aircraft brake temperatures is therefore desired.

SUMMARY

A first aspect of the present invention provides a sensor apparatus for use in measuring the temperature of an aircraft brake. The sensor apparatus comprises: a temperature sensor for attachment to a brake disc of an aircraft brake, and a relay for attachment to the brake. The temperature sensor is configured to wirelessly transmit a measurement signal containing information relating to a temperature of the brake disc, responsive to receiving a wireless interrogation signal. The relay is configured to: receive an interrogation signal from a remote interrogation apparatus; wirelessly transmit the received interrogation signal to the temperature sensor; receive the wireless measurement signal from the temperature sensor; and transmit the received measurement signal.

Optionally, the relay is configured to wirelessly transmit the received measurement signal, and comprises a first antenna for mounting at a first location on the brake, connected by a wire to a second antenna for mounting at a second location on the brake.

Optionally, the relay is configured to transmit the measurement signal along a wire, and comprises an antenna for mounting on the brake. The antenna may be connectable by a wire to the remote interrogation apparatus.

Optionally, the temperature sensor comprises a transducer configured to transduce the received wireless interrogation signal into a surface acoustic wave, SAW, and to transduce the SAW into the measurement signal. The transducer may comprise a piezoelectric transducer comprising at least one interdigitated electrode.

A second aspect of the present invention provides a brake temperature sensing system for an aircraft. The brake temperature sensing system comprises a sensor apparatus according to the first aspect and an interrogation apparatus for use in measuring the temperature of an aircraft brake. The interrogation apparatus comprises a controller and a transceiver. The controller is configured to generate an interrogation signal configured to cause a remote sensor apparatus to transmit a measurement signal containing information relating to the temperature of a brake disc. The transceiver is configured to: transmit the generated interrogation signal to the remote sensor apparatus; and receive the measurement signal transmitted by the remote sensor apparatus. Optionally, the controller may be further configured to determine a temperature of a brake disc based on a received measurement signal.

The transceiver may be configured to receive the measurement signal via a wireless connection to the remote sensor apparatus. The transceiver may be configured to receive the measurement signal via a wired connection to the remote sensor apparatus.

Optionally, the controller is configured to modulate the interrogation signal to minimise interference with other signals which may be present in a signal path between the transceiver and the remote sensor apparatus when the interrogation apparatus is in operation on an aircraft.

Optionally, the transceiver comprises a separate unit from the controller, and wherein the transceiver is connected to the controller by a communications link.

Optionally, the controller is configured to generate the interrogation signal responsive to receiving a command signal from an aircraft on which the interrogation apparatus is installed.

Optionally, the controller is further configured to output, to an aircraft on which the interrogation apparatus is installed, a reporting signal based on a received measurement signal.

A third aspect of the present invention provides an aircraft brake comprising a brake disc, a further component located such that it is between the brake disc and a landing gear when the brake is in operation on the landing gear, and the sensor apparatus of the first aspect. The temperature sensor is attached to the brake disc and the relay is attached to the further component.

Optionally, the further component comprises a torque tube. Optionally, the temperature sensor is bonded to the brake disc. Optionally, the brake disc comprises a stator. Optionally the brake disc is located at or near the centre of the brake in the axial direction.

Optionally the relay comprises an antenna at a first location on the brake and a wire connected to the antenna and extending between the first location and a second location on the brake. The brake may further comprise a structure configured such that it impedes the transmission of wireless signals through the structure. The structure may be located such that it is between the first location and the second location and is not between the first location and the temperature sensor.

A fourth aspect of the invention provides an aircraft comprising the brake of the third aspect and the interrogation apparatus of the system of the second aspect. The interrogation apparatus may be attached to a landing gear on which the brake is mounted. The interrogation apparatus may be attached to a wing of the aircraft. The interrogation apparatus may be attached to a fuselage of the aircraft. The interrogation apparatus may be comprised in an avionics box of the aircraft.

A fifth aspect of the present invention provides a brake disc for use in an aircraft brake. The brake disc comprises a temperature sensor attached to the brake disc by a mounting element. The brake disc comprises a first formation and the mounting element comprises a second formation shaped to interlock with the first formation so as to prevent relative movement between the brake disc and the mounting element along an axial direction and a circumferential direction of the brake disc.

Optionally, the first formation comprises a recess in a circumferential surface of the brake disc, and the second formation is shaped to be receivable within the recess.

Optionally, the recess comprises a notch configured to receive a spline on a torque tube of the brake pack, wherein the mounting element comprises a clip disposed between the surface of the notch and the spline when the spline is received in the notch, and wherein the second formation comprises a section of the clip having an external profile shaped to match an internal profile of the notch.

Optionally, the mounting element comprises a pin, wherein the stem of the pin is received within the recess, and wherein the temperature sensor is attached to the head of the pin. The brake disc may comprise a notch configured to receive a spline on a torque tube of the brake pack, and the recess may be in a base of the notch such that the head of the pin is adjacent the base of the notch.

Optionally, the mounting element comprises a portion of adhesive material disposed between the first formation and the temperature sensor. The second formation may be comprised by a surface of the portion of adhesive material in contact with the first formation. The adhesive material may comprise a ceramic epoxy material.

A sixth aspect of the present invention provides a method of attaching a temperature sensor to a brake disc for an aircraft brake. The method comprises: providing a brake disc comprising a first formation; providing a mounting element on the brake disc such that the first formation is interlocked with a second formation of the mounting element so as to prevent relative movement between the brake disc and the mounting element along an axial direction and a circumferential direction of the brake disc; and providing the temperature sensor on the mounting element.

Optionally, providing the temperature sensor on the mounting element comprises bonding the temperature sensor to the mounting element.

Optionally, the mounting element comprises a portion of cured adhesive material. Providing the mounting element on the brake disc may comprise applying uncured adhesive material to the surface of the first formation to create the second formation. Providing the temperature sensor on the mounting element may comprises contacting the temperature sensor with the uncured adhesive material and subsequently curing the adhesive material.

BRIEF DESCRIPTION OF THE DRAWINGS

Embodiments of the invention will now be described, by way of example only, with reference to the accompanying drawings, in which:

FIG. 3a shows a schematic view of a first example relay for the sensor apparatus of FIG. 2a;

FIG. 3b shows a schematic view of a second example relay for the sensor apparatus of FIG. 2a;

FIG. 4 illustrates the operation of an example temperature sensor for the sensor apparatus of FIG. 2a;

DETAILED DESCRIPTION

Aircraft, and in particular commercial aircraft, are usually equipped with a brake temperature monitoring system (BTMS) for measuring and monitoring the temperatures of the wheel brakes. A BTMS comprises a temperature sensor for each braked wheel. Each of the temperature sensors is connected by a wired communications link (sometimes via an intermediary processing unit) to a central computer, which is usually located in the avionics bay of the aircraft. Temperature values measured by each of the temperature sensors may thereby be communicated to the cockpit, for use by the flight crew in determining whether the brakes are cool enough for the aircraft to dispatch and then subsequently take-off.

As mentioned above, current BTMSs comprise thermocouples for measuring brake temperature, which presents various challenges. The following disclosure presents a brake temperature sensing system comprising a combination of a sensor apparatus and an interrogation apparatus, which may be used as a temperature sensor of a BTMS (e.g. in place of a thermocouple). The brake temperature sensing system seeks to overcome or avoid some or all of the challenges associated with measuring aircraft brake temperatures using thermocouples.

Figure 1:
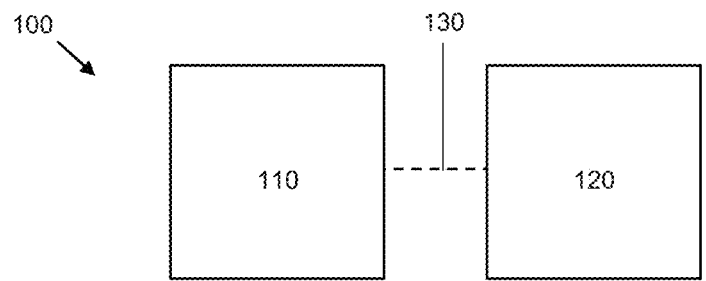
FIG. 1 shows a schematic view of a brake temperature sensing system according to an example.

FIG. 1 shows an example brake temperature sensing system 100. The brake temperature sensing system 100 can be used to detect the temperature of an aircraft brake, and in particular the temperature of a brake disc of an aircraft brake, e.g. as part of a BTMS of the aircraft. The brake temperature sensing system 100 comprises a sensor apparatus 110, which is connected by a communications link 130 to an interrogation apparatus 120. The communications link 130 may wired, wireless, or part wired and part wireless. The brake temperature sensing system 100 is configured such that the interrogation apparatus 120 is able to be located remotely from the sensor apparatus 110 when the brake temperature sensing system 100 is installed on an aircraft. For example, the sensor apparatus 110 may be located on or in a brake pack, whilst the interrogation apparatus 120 is located on the landing gear, in a landing gear bay, wing or fuselage of the aircraft. This advantageously means that the interrogation apparatus 120 can be provided in an environment which is less harsh than the immediate environment of the brake pack. The brake temperature sensing system 100 is connectable to an aircraft avionics system in any suitable manner, such that the brake temperature sensing system 100 is able to communicate measured temperature values to the aircraft avionics system. At least some components of the brake temperature sensing system 100 can be configured to receive power via a connection to aircraft avionics system or via an independent power connection from the aircraft.

Figure 2A:
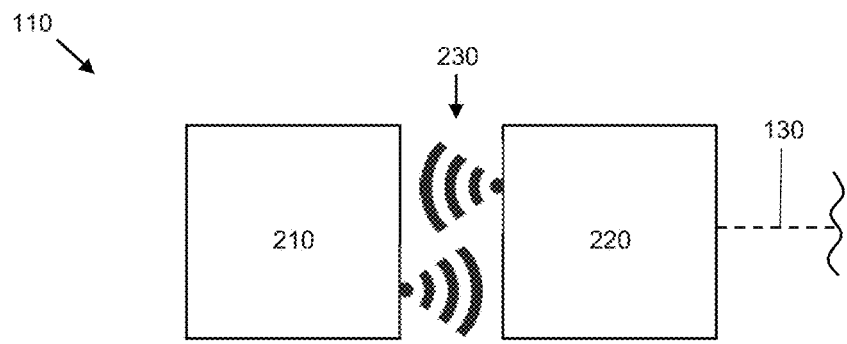
FIG. 2a shows a schematic view of a sensor apparatus according to an example.

FIG. 2a shows the sensor apparatus 110 in more detail. The sensor apparatus 110 is for use in measuring the temperature of an aircraft brake, e.g. a brake comprising a multiple-discs brake pack. The sensor apparatus 110 comprises a temperature sensor 210, which is suitable for attachment to a brake disc of an aircraft brake pack, and a relay 220 which is suitable for attachment to a further component of the brake pack, e.g. a component other than the brake disc to which the temperature sensor is attached. The temperature sensor 210 is configured to wirelessly transmit a measurement signal containing information relating to a temperature of the brake disc, responsive to receiving a wireless interrogation signal (e.g. a wireless interrogation signal sent by the interrogation apparatus 120). The relay 220 is configured to receive an interrogation signal from a remote interrogation apparatus; to wirelessly transmit 230 the received interrogation signal to the temperature sensor; to receive the wireless measurement signal 230 from the temperature sensor; and to transmit the received measurement signal (e.g. back to the interrogation apparatus 120). The wireless communication between the temperature sensor 210 and the relay 220 can be effected, for example, by electromagnetic, inductive or capacitive coupling of the relay 220 to the temperature sensor 210. For example, each of the relay and the temperature sensor may comprise an antenna configured to convert electrical signals to radio waves and vice versa, with the radio waves being transmitted between the relay and the temperature sensor.

In some examples the relay is configured to wirelessly transmit the received measurement signal (e.g. to the interrogation apparatus 120). FIG. 3a shows a relay 220a according to one such example. The relay 220a comprises a first antenna 310a for mounting at a first location on a brake. The first antenna 310a can comprise, e.g., a high temperature printed alumina based antenna. The first antenna 310a may comprise a packaged antenna, e.g. in which the packaging is configured to protect the antenna from the harsh environment of the brake pack. The first antenna 310a is connected by a high temperature wire 330 to a second antenna 320. The second antenna 320 is for mounting at a second location on the brake. The second antenna 320 can comprise, e.g., a patch antenna. The second antenna 320 may comprise any or all of the features of the first antenna 310a. The wire 330 is of any suitable construction for relaying signals between the first and second antennas 310a, 320. The wire 330 is long enough for the first antenna 310 to be located adjacent a brake disc on which the temperature sensor 210 is mounted, and the second antenna 320 to be located on an outer part of the brake in a location such that a line of sight transmission path exists between the second antenna 320 and a transceiver of the interrogation apparatus 120 when the system 100 is installed on an aircraft. The relay 220a therefore enables a signal to be passed from one part of a brake to another, even in cases when an attenuating structure present between the parts prevents the transmission of a wireless signal between the parts.

In examples which use a "two-antenna" relay such as the relay 220a, the communications link between the temperature sensor 210 and the interrogation apparatus 120 includes two transmission "gaps", over which communication is effected wirelessly. The transmission gap between the relay 220a and the interrogation apparatus 120 removes the need to provide wiring and connectors on the lower landing gear when the brake temperature sensing system 100 is installed on an aircraft. This can be advantageous for the reliability of the system 100 because the environment of the lower landing gear is particularly harsh (e.g. due to large temperature changes, high maximum temperatures, high levels of vibration, exposure to water and debris, or to de-icing fluids). Wiring and connectors present in this region can easily become damaged (for example through corrosion) and so must be well protected and/or frequently replaced.

In some examples the relay 220 is configured to transmit the measurement signal along a wire to the interrogation apparatus 120. FIG. 3b shows a relay 220b according to one such example. The relay 220b comprises an antenna 310b, which may have any or all of the features of the first antenna 310a of the relay 220a described above. The antenna 310b is connected to a wire 350, which is connectable to the interrogation apparatus 120 to provide a wired communications link between the relay 220b and the interrogation apparatus 120. The wire 350 may be of any suitable construction. In some examples the distal end of the wire 350 terminates in a connector, which is connectable to the interrogation apparatus 120 and/or to a further wire.

In some examples the temperature sensor 210 comprises a transducer configured to transduce the received wireless interrogation signal into a surface acoustic wave, SAW, and to transduce the SAW into the measurement signal. In some examples the transducer comprises a piezoelectric transducer comprising at least one interdigital electrode. The transducer may comprise a two-port SAW resonator. Alternatively, the transducer may comprise a one-port SAW resonator. The transducer may further comprise one or more reflectors. Various suitable transducer designs are known in the art, e.g. the transducer designs described in "A Review of Wireless SAW Sensors" by Alfred Pohl (*IEEE Transactions on Ultrasonics, Ferroelectrics and Frequency Control*; vol. 47, no. 2, pp 317-332). In some examples the temperature sensor 210 further comprises an antenna, which may be, e.g., bonded to terminals of the transducer. The temperature sensor antenna may have any or all of the features of the first antenna 310a or the second antenna 320 described above. The temperature sensor antenna may be the same as the first antenna 310a, b, on the relay 220. In a particular example, the temperature sensor antenna operates to convert a radio wave received from the relay 220 to an electrical wave that can be passed through the piezoelectric transducer, and then to convert an electrical wave output by the transducer back into a radio wave for transmission back to the relay 220. The temperature sensor 210 is preferably a passive device, such that it does not require electrical power to operate. A SAW-based temperature sensor can advantageously be made robust enough to operate reliably in very harsh environments, and can also be very compact. This enables direct attachment to a brake disc, the temperature of which it is desired to measure.

FIG. 4 illustrates the principle of operation of a temperature sensor according to one such example. In the example of FIG. 4, an example temperature sensor 400 comprises a two-port SAW resonator having an input interdigital transducer (IDT) 420 and an output IDT 430. Each of the input IDT 420 and the output IDT 430 comprises two interlocking comb-shaped arrays of metallic electrodes, deposited on the surface of a piezoelectric substrate 450 to form a periodic structure. The materials used to construct the temperature sensor 400 are selected to be able to withstand high temperatures and large temperature changes. The input IDT 420 is provided at a first location on the substrate 450 and the output IDT 430 is provided at a second location on the substrate 450, such that there is a space between the input and output IDTs. The input IDT 420 converts an electric signal to a surface acoustic wave (SAW) by generating periodically distributed mechanical forces via the piezoelectric effect. The SAW propagates across the space between the input IDT 420 and the output IDT 430. When the SAW reaches the output IDT 430, the output IDT converts the SAW back to an electric signal by the same principle. The input IDT may be configured to match the wavelength of an interrogation signal transmitted by an interrogation apparatus of a brake temperature sensing system in which the temperature sensor 400 is comprised. For example, the input IDT can be configured such that the spacing of the IDT fingers (i.e. the distance between the fingers) is approximately half of the interrogation signal wavelength. The finger spacing changes with temperature, and therefore the operating frequency of the device changes with temperature, as will be discussed further below. In some examples the input IDT 420 comprises a broadband IDT. In some examples the output IDT 420 is a coded IDT.

In operation, the temperature sensor 400 receives an interrogation signal 410, e.g. transmitted by a relay of a sensor apparatus in which the temperature sensor 400 is comprised. The interrogation signal 410 was previously generated and transmitted to the relay by an interrogation apparatus (e.g. the interrogation apparatus 120). The wavelength of the interrogation signal 410 is determined by the frequency of the interrogation signal 410. In principle the interrogation signal may have any frequency, and indeed may vary in frequency. However, frequencies within an International Scientific and Medical (ISM) band may be advantageous for regulatory reasons. In some examples the interrogation signal 410 comprises a radio frequency (RF) signal. In particular examples, the interrogation signal 410 scans across all frequencies within a predetermined band, over a time period. In such examples, the transducer may be configured such that it outputs a signal in response to only one or only some of the interrogation frequencies. The interrogation signal 410 is received by the temperature sensor 400 in the form of an electrical signal, by virtue of, e.g., electromagnetic coupling between the temperature sensor 400 and the relay.

The electrical signal causes the input IDT 420 to generate a SAW (indicated on FIG. 4 by the block arrow), as described above, which propagates across the substrate 450 to the output IDT 430, which in turn converts the generated SAW back into an electrical signal 440. The electrical signal generated by the output IDT 430 contains information relating to the temperature of the temperature sensor 400 (which will be equal or substantially equal to the temperature of a brake disc to which the temperature sensor 400 is attached) and therefore comprises a measurement signal. The electronic measurement signal 440 is transmitted to the relay of the sensor apparatus in which the temperature sensor 400 is comprised, e.g. by means of electromagnetic coupling between the temperature sensor 400 and the relay.

The process of converting an electrical signal to a SAW, and then back to an electrical signal is affected by the temperature of the temperature sensor 400. In particular, the velocity at which the SAW propagates between the input IDT 420 and the output IDT 430 is altered by a change in temperature (as a result of thermal expansion of the substrate 450). The temperature sensor 400 is configured such that there exists a well-defined relationship between temperature and SAW velocity. The delay between receipt of the interrogation signal 410 by the temperature sensor 400 and transmission of the measurement signal 440 will therefore depend on the temperature of the temperature sensor 400, and thus on the temperature of a brake disc to which the temperature sensor 400 is attached. A measured temperature value can therefore be determined, e.g. by the interrogation apparatus 120, based on the time at which an interrogation signal is transmitted by the interrogation apparatus and the time at which a measurement signal corresponding to that interrogation signal is received by the interrogation apparatus.

The particular operating principle described in the preceding paragraphs may be considered to be based on a time response of the transducer of the temperature sensor 400. However; it is also possible to implement the system 100 based on a frequency response of the transducer, or a phase shift response of the transducer. In the case of a frequency-based system, the interrogation signal will scan across all frequencies within a predefined band. Only when the frequency of the interrogation signal matches the spacing of the input IDT of the temperature sensor will the temperature sensor output a signal (i.e. the measurement signal), which will have the same frequency as the interrogation signal. As mentioned above, the spacing of the IDT fingers is temperature dependent, therefore the frequency of the measurement signal is indicative of the current temperature of the transducer. Various frequency-response and phase shift-response SAW sensor systems are known in the art, e.g. the systems described in "A Review of Wireless SAW Sensors" by Alfred Pohl (*IEEE Transactions on Ultrasonics, Ferroelectrics and Frequency Control*; vol. 47, no. 2, pp 317-332).

Figure 2B:
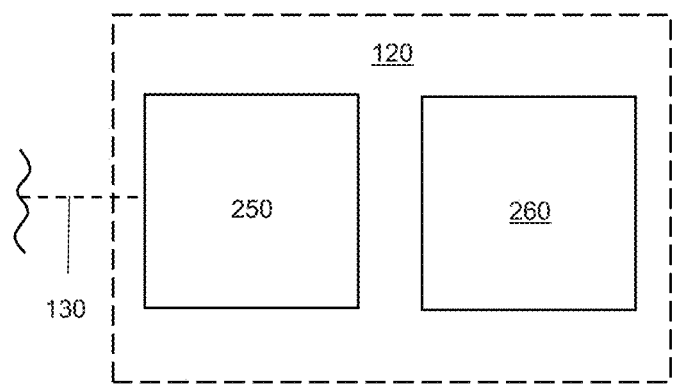
FIG. 2b shows a schematic view of an interrogation apparatus according to an example.

FIG. 2b shows the interrogation apparatus 120 in more detail. The interrogation apparatus 120 is for use in measuring the temperature of an aircraft brake, e.g. a brake comprising a multiple-discs brake pack. The interrogation apparatus 120 comprises a transceiver 250 and controller 260. The controller 260 is configured to generate an interrogation signal configured to cause a remote sensor apparatus to transmit a measurement signal containing information relating to the temperature of a brake disc. The interrogation signal may have any or all of the features described above in relation to the sensor apparatus 110. In some examples the interrogation apparatus 120 is configured to be able to adjust one or more properties of the interrogation signal. For example, the interrogation apparatus may be arranged to controllably vary the frequency of a generated interrogation signal. In some examples the controller 260 is further configured to determine a temperature of a brake disc based on the information and/or data in a received measurement signal. In some examples the controller 260 is further configured to generate a reporting signal for transmission to a remote controller (e.g. a controller of an aircraft avionics system), based on a received measurement signal. In some examples the received measurement signal can comprise an analogue voltage signal. Alternatively, the received measurement signal can comprise temperature data. The received measurement signal may have any or all of the features described above in relation to the sensor apparatus 110.

The transceiver 250 is configured to transmit the generated interrogation signal to the remote sensor apparatus; and to receive the measurement signal transmitted by the remote sensor apparatus, and may be of any suitable construction known in the art. In some examples (e.g. examples in which the system 100 is based on a time-response of the sensor apparatus) the transceiver 250 is configured to generate the interrogation signal at a first time $t_1$. In some such examples the transceiver is configured to receive the measurement signal at a second time $t_2$. The transceiver 250 and/or the controller 260 may apply a time stamp to the received measurement signal to indicate the time at which it was received (i.e. the second time $t_2$). In some examples (e.g. examples in which the system 100 is based on a frequency-response of the sensor apparatus) the transceiver 250 is configured to generate a time-varying interrogation signal, the frequency of which changes over a time period. In some such examples, the transceiver 250 is configured to generate an interrogation signal which scans across a predetermined frequency band over a time period.

In some particular examples the interrogation apparatus is additionally configured to verify that a given received measurement signal corresponds to a given transmitted interrogation signal. For example, the sensor apparatus could be configured to encode a transmitted measurement signal with a code specific to that sensor apparatus (e.g. a pseudo-random code), and the interrogation apparatus could be pre-programmed with a code corresponding to the or each sensor apparatus with which it is in communication. In some examples (e.g. examples in which the sensor apparatus 110 comprises the relay 220a of FIG. 3a) the transceiver is configured to receive the measurement signal via a wireless connection to the sensor apparatus 110. In other examples (e.g. examples in which the sensor apparatus 110 comprises the relay 220b of FIG. 3b) the transceiver is configured to receive the measurement signal via a wired connection to the sensor apparatus 110.

In some examples the controller 260 is configured to determine a temperature of a brake disc based on an attribute of the received measurement signal. For example, in time-response based systems, the attribute may comprise the time of receipt of the measurement signal, which is indicative of the time delay between the sending of an interrogation signal and the receiving of a measurement signal corresponding to that interrogation signal. For example, the controller may determine the temperature of a brake disc based on the quantity $t_2-t_1$. In some examples the controller 260 is configured to determine a temperature of a brake disc based on a predefined relationship between $t_2-t_1$ and brake disc temperature. The predefined relationship can be stored in a memory comprised in or accessible by the controller 260, e.g. in the form of a look-up table, rule, correlation equation, graph, etc. Alternatively, in frequency-response based systems, the attribute may comprise the frequency of the measurement signal. In some examples the controller 260 is configured to determine a temperature of a brake disc based on a predefined relationship between measurement signal frequency and brake disc temperature. The predefined relationship can be stored in a memory comprised in or accessible by the controller 260, e.g. in the form of a look-up table, rule, correlation equation, graph, etc.

FIG. 2b shows the transceiver 250 and controller 260 comprised in a single unit, which may, e.g., comprise a single housing containing the controller 260 and the transceiver 250. However; it is also possible for the transceiver to comprise a separate unit from the controller, in which case the transceiver 250 will be connected to the controller 260 by a communications link (which may be wired or wireless). For example, the controller 260 may be implemented as a function of a general avionics system of an aircraft, located in an avionics bay within the fuselage, and the transceiver may be located outside of the fuselage, e.g. on a wing, in a landing gear bay or on the landing gear of the aircraft.

In some examples the controller 260 is configured to modulate the interrogation signal, e.g. to minimise interference with other signals which may be present in a signal path between the transceiver 250 and the remote sensor apparatus 110 when the brake temperature sensing system 100 is in operation on an aircraft, and/or to achieve higher transmit power levels. Additionally or alternatively, such modulation may seek to minimize the effect of the interrogation signal on other electronic systems of an aircraft on which the interrogation apparatus 120 is installed. Additionally or alternatively, such modulation may enable the controller to determine whether a given received measurement signal corresponds to a given transmitted interrogation signal. The controller 260 can modulate the interrogation signal, for example, by digitally formatting the interrogation signal. In a particular example, the controller 260 is configured to modulate the interrogation signal using binary phase-shift keying (BPSK).

In some examples the controller 260 is configured to generate the interrogation signal responsive to receiving a command signal from an aircraft on which the interrogation apparatus 120 is installed. In some such examples the command signal comprises an interrogation signal, previously generated by the aircraft (e.g. by an avionics system of the aircraft) which can be simply retransmitted by the interrogation apparatus. In such cases generating the interrogation signal by the interrogation apparatus 120 comprises transmitting the received command signal. In other examples the command signal does not comprise an interrogation signal but instead is configured to cause the interrogation apparatus to generate an interrogation signal. In some examples the controller 260 can further be configured to output, to the aircraft on which the interrogation apparatus 120 is installed, a reporting signal based on the determined temperature. The reporting signal can comprise, for example, one or more of: a measured temperature value, a time series of measured temperature values, meta data associated with one or more measured temperature values, etc. In some examples the reporting signal comprises an analogue voltage signal. The controller 260 may therefore be connectable to an avionics system of the aircraft on which the interrogation apparatus 120 is installed, so as to enable data to be exchanged between the interrogation apparatus 120 and the avionics system. Furthermore, in some examples the controller 260 is arranged to receive power via a connection to system of an aircraft on which the interrogation apparatus 120 is installed.

Figure 5:
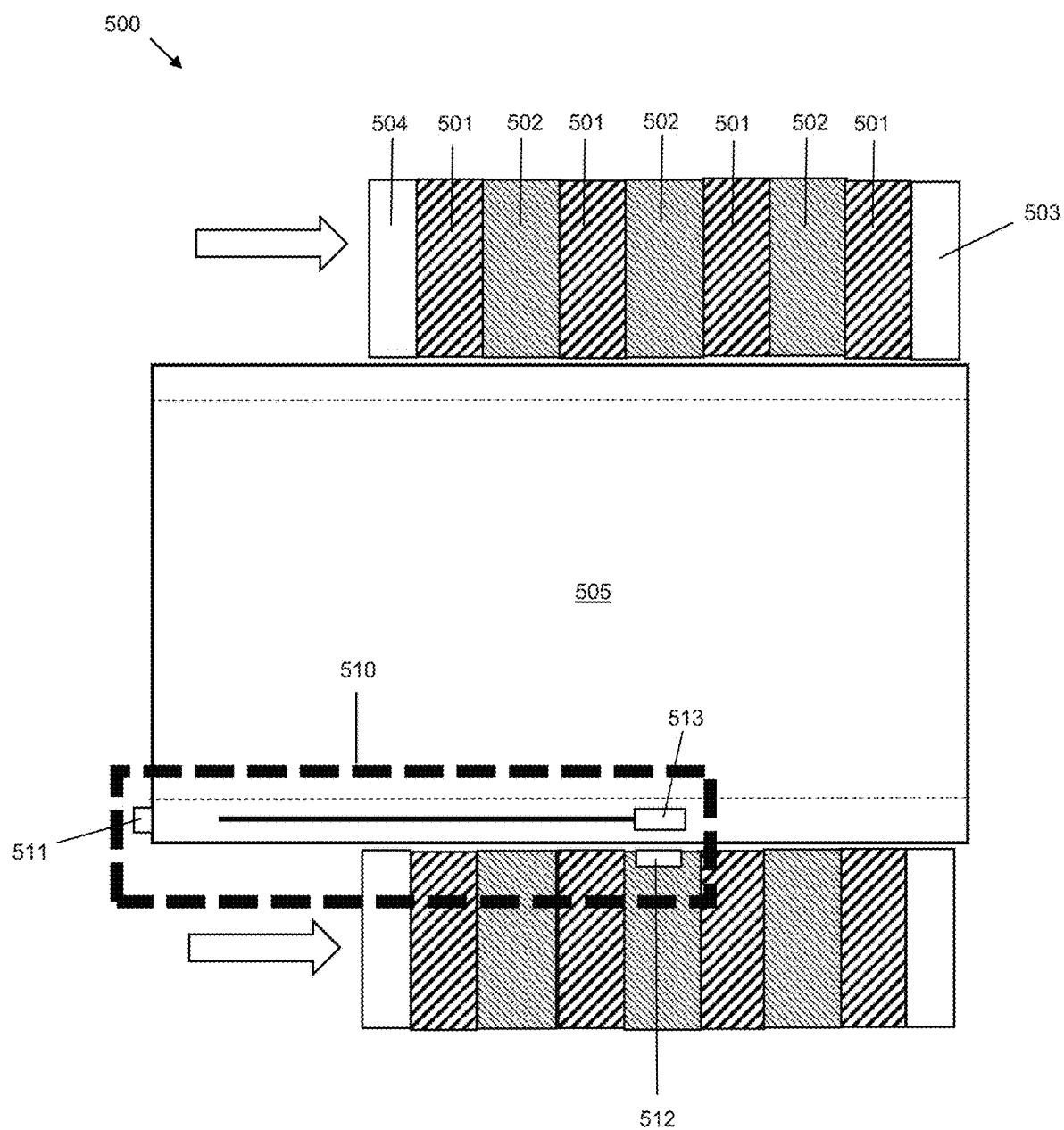
FIG. 5 shows a cross-section through a typical aircraft brake according to an example.

As discussed above, the sensor apparatus 110 is for attachment to an aircraft brake, and when the brake temperature sensing system 100 is installed on an aircraft it is expected that the temperature sensor 210 will be attached to a brake disc of a brake pack and the relay 220 will be attached to a further component of the brake, the further component being located such that it is between the brake disc and a landing gear when the brake pack is in operation on the landing gear. FIG. 5 shows an example aircraft brake 500 comprising a sensor apparatus 510 (which may have any or all of the features of the sensor apparatus 110 described above).

The brake 500 comprises a multi-disc brake pack (that is, the brake pack comprises a plurality of brake discs). The plurality of brake discs includes a plurality of rotors 501 which are keyed to an aircraft wheel in which the brake pack is installed such that they rotate together with the wheel, and a plurality of stators 502 which are configured to remain stationary with respect to the aircraft wheel. The rotors 501 and/or the stators 502 may comprise a carbon-based material, or any other material suitable for use in an aircraft brake disc (e.g. steel). The stators are keyed to a torque tube 505 which is fixedly attached to the landing gear and which reacts the torque produced during braking. The brake 500 may further comprise a pressure plate 504 and a back plate 503. A clamping force (represented in FIG. 5 by the block arrows) is applied to the pressure plate 504 via a set of pistons (not shown), which can be either hydraulically or electrically actuated. This clamping force compresses the entire stack of stators 502 and rotors 501 between the pressure plate 504 and the back plate 503. This creates friction between the stators 502 and rotors 501, which slows the rotation of the rotors 501, and therefore the wheel.

The sensor apparatus 510 comprises a temperature sensor 512 and a relay having a first antenna 513 and a second antenna 511. The temperature sensor may have any or all of the features of the temperature sensor 210 described above. The relay may have any or all of the features of the relay 220 described above. The particular example of FIG. 5 shows a relay having first and second antennas connected by a wire (i.e. a relay of the same type as the relay 220a described above), however a relay of the same type as the relay 220b (i.e. having a single antenna) could alternatively be used.

The temperature sensor 512 is attached to a stator 502 located in the centre of the stack of stators and rotors. In alternative examples the temperature sensor 512 is attached to a stator at a different position in the stack, or is attached to a rotor 501. Indeed, it is possible for the temperature sensor 512 to be attached to any of the brake discs of the brake pack 500. However; to ensure a consistent signal path between the temperature sensor 512 and the first antenna 513 of the relay, it is advantageous for the temperature sensor 512 to remain substantially stationary with respect to the relay. Brake wear will cause axial movement of the sensor and therefore change the relative position between the sensor and relay antenna over time as the brake wears. To overcome this, the relay antenna 513 needs to be of sufficient length to maintain an acceptable line of sight to the sensor. As a result of the temperature sensor being attached to a brake disc, the temperature measured by the sensor at any given time is the actual temperature of the disc at that time. The temperature measurements output by the temperature sensor can therefore indicate the actual temperature of the brake disc with a very high degree of accuracy. Advantageously, this can reduce or eliminate the need to perform any corrections or other processing on the measured data.

The relay is attached to a further component of the brake (i.e. a component other than the brake disc to which the temperature sensor 512 is attached). The further component may comprise, e.g., a torque tube, a piston housing (for hydraulically actuated brakes), an actuator housing (for electrically actuated brakes), or any other component sufficiently close to the brake disc to enable the relay to communicate with the temperature sensor. In some examples the relay is attached to multiple further components of the brake. The first antenna 513 is attached to the structure of the brake at a first location and the second antenna 511 is attached to the brake structure at a second location. The first location may be close to an operational location of the temperature sensor 512, such that the first antenna 513 can receive a wireless signal transmitted by the temperature sensor 512 when the sensor apparatus 510 is installed on an aircraft. The first location may be such that attenuation of a signal travelling between the first location and the operational location of the temperature sensor 512 is minimized. The second location may be such that a wireless signal path exists between the second location and an operational location of a transceiver of an interrogator apparatus (e.g. the interrogator apparatus 120). The second location may be such that the attenuation of a signal travelling between the second location and the operational location of a transceiver of an interrogator apparatus (e.g. the interrogator apparatus 120) is minimized.

In the particular example of FIG. 5, the first antenna 513 and most of the wire of the relay is embedded in a spline of the torque tube 505, and the second antenna 511 is attached to a piston housing (for hydraulically actuated brakes) or an actuator housing (for electrically actuated brakes).

Figure 6:
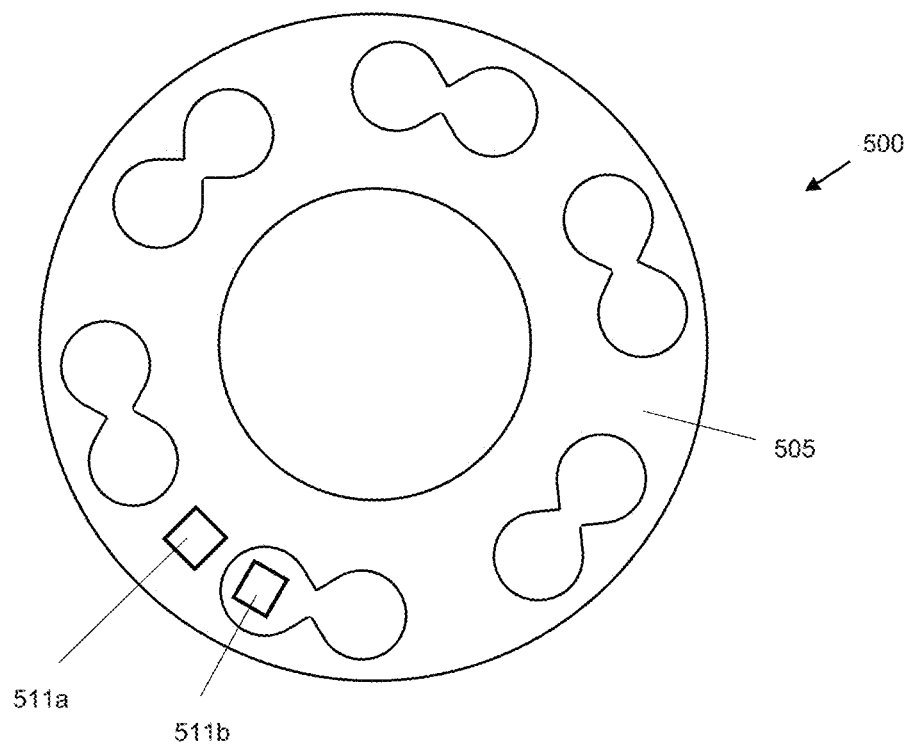
FIG. 6 shows a top view of the example brake of FIG. 5.

FIG. 6 shows a top view of the torque tube 505, such that the piston housing is shown. Two possible locations 511a and 511b at which the second antenna 511 can be attached to the piston housing are shown (it will be appreciated that other suitable locations may exist). The second antenna can, for example, be provided in the form of a patch antenna which is suitable for bonding to the piston housing at the location 511a or the location 511b.

Figure 7:
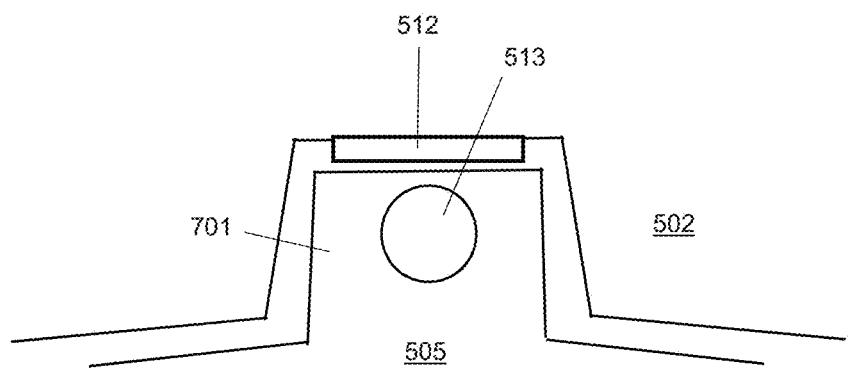
FIG. 7 is a partial view of a brake disc and a torque tube of the example brake of FIG. 5.

FIG. 7 shows a possible arrangement of the first antenna 513 and the temperature sensor 512 (it will be appreciated that other suitable arrangements may exist). In the example of FIG. 7, the temperature sensor 512 is attached, e.g. by bonding, to an inner circumference of a stator 502, in a notch between two lugs of the stator which receives a spline 701 of the torque tube 505 (the stator 502 is keyed to the torque tube 505 by means of engagement between splines 701 on the outer circumference of the torque tube 505 and corresponding notches in the inner circumference of the stator 502, the notches being defined by lugs). The first antenna 513 is provided on or in the spline 701 corresponding to the notch in which the temperature sensor 512 is attached, such that the distance between the temperature sensor 512 and the first antenna 513 is very small. Moreover, the placement of the first antenna 513 is such that the amount of relative movement between the temperature sensor 512 and the first antenna 513 over the lifetime of the brake (a small amount of relative movement due to, e.g. vibration, thermal expansion, or the like is expected during braking, as well as some axial displacement due to brake wear) is small enough not to disrupt the communications path between the temperature sensor and the first antenna. For example, the first antenna 513 may be attached to the spline, placed on the spline, or routed through the spline. In the particular example of FIG. 7 the first antenna 513 is received within a hole that has been machined into the spline 701.

The brake disc environment is extremely harsh, e.g. because the disc experiences very high temperatures and vibration levels during braking. Moreover, large temperature changes are experienced over the course of a braking cycle.

This presents significant challenges for securely attaching a temperature sensor to a brake disc. The following disclosure relates to a brake disc for use in an aircraft brake pack which seeks to address these challenges.

Figure 8:
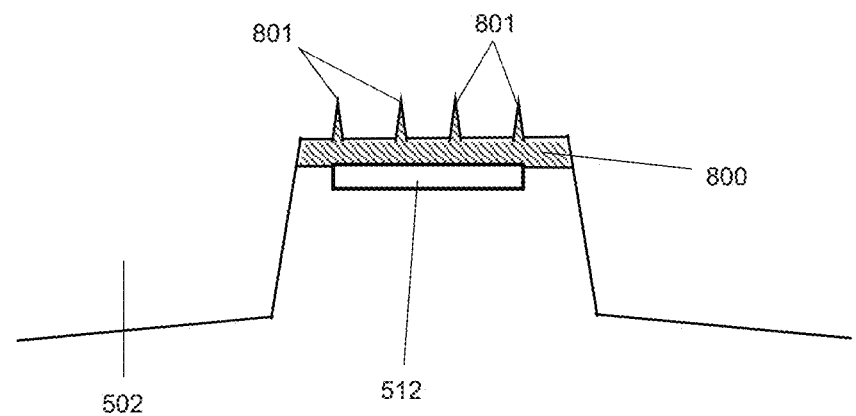
FIG. 8 illustrates a first example attachment technique for attaching a temperature sensor to a brake disc (e.g. a stator)
Figure 9A:
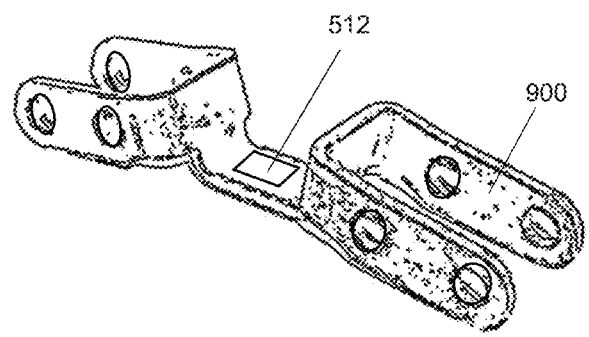
FIGS. 9a and 9b illustrate a second example attachment technique for attaching a temperature sensor to a brake disc (e.g. a stator) using a metal clip.
Figure 9B:
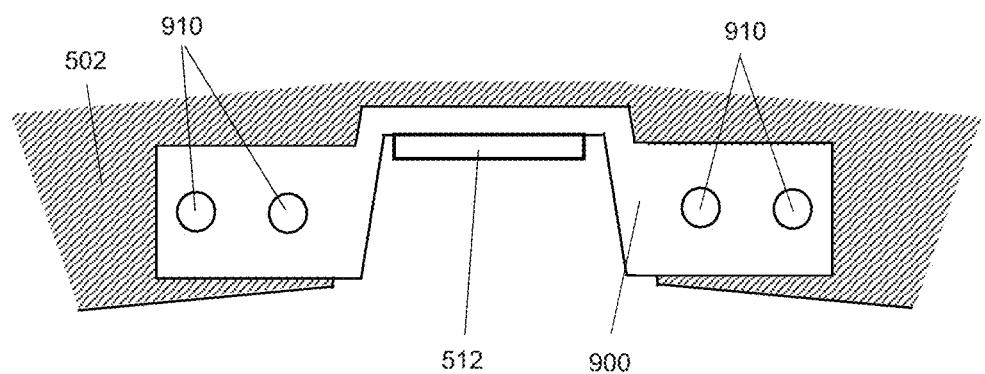
Figure 10:
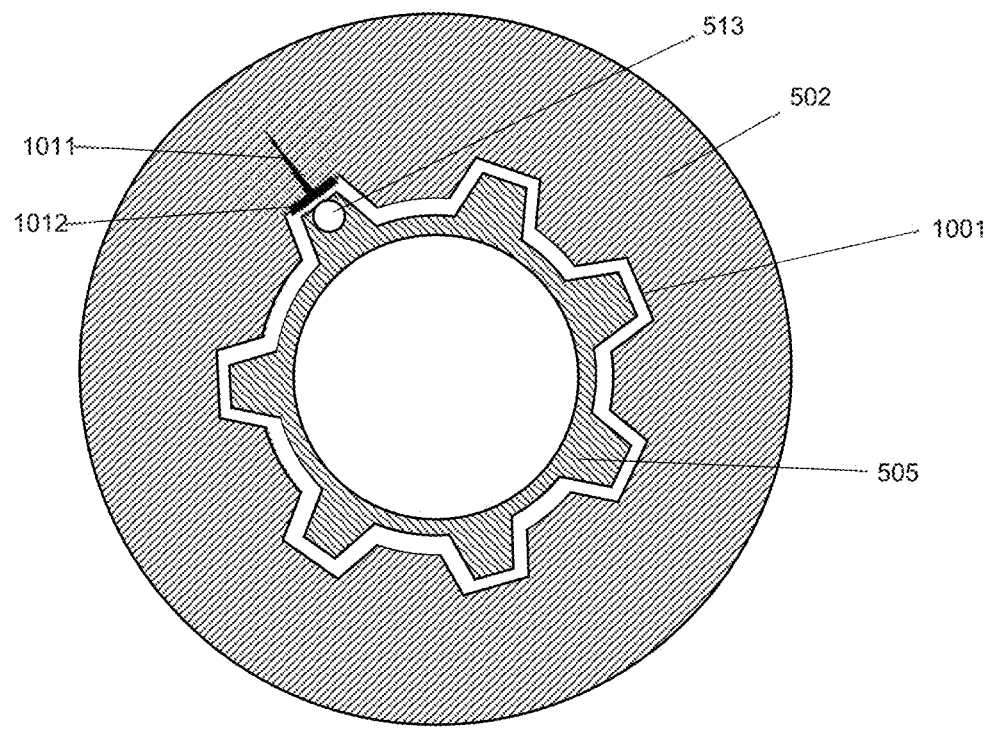
FIG. 10 illustrates a third example attachment technique for attaching a temperature sensor to a brake disc.

In an example, a brake disc for use in an aircraft brake pack comprises a temperature sensor attached to the brake disc by a mounting element. The brake disc comprises a first formation, and the mounting element comprises a second formation shaped to interlock with the first formation so as to prevent relative movement between the brake disc and the mounting element along an axial direction and a circumferential direction of the brake disc. Various techniques are envisaged for achieving a suitable mechanical interlock. FIGS. 8-10 illustrate three examples of suitable attachment techniques.

FIG. 8 shows a section of the internal circumference of a brake disc 502 (which in the illustrated example comprises a stator). In the example of FIG. 8 the mounting element comprises a portion of cured adhesive material 800 (e.g. a ceramic epoxy adhesive material) disposed between the first formation and the temperature sensor, and the second formation is comprised by a surface of the portion of cured adhesive material 800 in contact with the first formation. In the illustrated example the first formation comprises grooves 801 in a region of the circumferential surface of the brake disc 502. Although four such grooves are shown, any other number (including one) of grooves could be used instead. In the illustrated example the region is located at the base of a notch configured to receive a torque tube spline, but the region could alternatively be located on any other surface of a brake disc (e.g. it need not be on a circumferential surface). In alternative examples the first formation could comprise one or more ridges, or a combination of grooves and ridges. The grooves 801 may be created in the surface of the disc 502 using any suitable technique known in the art.

In the example of FIG. 8 the portion of cured adhesive material 800 fills the grooves 801. It will be appreciated that the surface of the portion of cured adhesive material 800 which is adjacent the circumferential surface of the brake disc 502 therefore comprises spikes, of corresponding shape to the grooves 801. These spikes provide the second formation which interlocks with the first formation. The spikes may be created, for example, by applying the adhesive material 800 to the region of the brake disc comprising the grooves whilst the adhesive material 800 is in an uncured state, such that it flows and or can be directed into the grooves 801. The spikes can then be formed by curing the adhesive material 800. Any adhesive material of suitable binding strength which can be applied in a liquid or semi-liquid uncured state and subsequently cured to a solid state can therefore be used to form the portion of adhesive material 800. The temperature sensor 512 is bonded to the portion of adhesive material 800. Such bonding can be achieved, for example, by contacting the temperature sensor 512 with the portion of adhesive material 800 whilst the adhesive material is in an uncured state, or at least is not in a fully cured state, and subsequently curing the adhesive material.

In some examples the first formation comprises a recess in a circumferential surface of the brake disc, and the second formation is shaped to be receivable within the recess. FIGS. 9a and 9b show one such example. In the example of FIGS. 9a and 9b the first formation comprises a notch configured to receive a spline of a torque tube, and the mounting element comprises a clip 900 disposed between the surface of the notch and the spline when the spline is received in the notch. The second formation comprises a section of the clip 900 having an external profile shaped to match an internal profile of the notch. The clip 900 may be formed, for example, from metal. It may perform the function of reinforcing the structure of the notch. It may, for example, protect the surfaces of the notch from damage caused by contact between the torque tube spline and the notch. The clip 900 is attached to the disc 502 by rivets 910 (although any suitable attachment method known in the art may alternatively be used). In the illustrated example the temperature sensor 512 is attached to the clip (e.g. by metal spray bonding) on a surface that is adjacent a surface of the torque tube spline when the spline is received in the notch. However; the temperature sensor could alternatively be attached to any other part of the clip 900, provided that location is suitable to enable wireless communication between the temperature sensor 512 and a relay antenna with which the temperature sensor 512 is to communicate (e.g. the first antenna 513).

FIG. 10 shows a further example in which the first formation comprises a recess 1001 in a circumferential surface of the brake disc 502, and the second formation, e.g., torque tube 505, is shaped to be receivable within the recess. In the example of FIG. 10 the mounting element comprises a pin, and the stem 1011 of the pin is received within the recess. The temperature sensor 512 is attached to the head 1012 of the pin by any suitable attachment technique, e.g. spray bonding. The pin may be formed from a metal. A high temperature adhesive may be used to firmly attach the pin head 1012 and stem 1011 to the brake disc. In the illustrated example the recess is located at the base of a notch configured to receive a torque tube spline, such that the head of the pin is adjacent the base of the notch. However; the recess could alternatively be located on any other surface of a brake disc.

Figure 11:
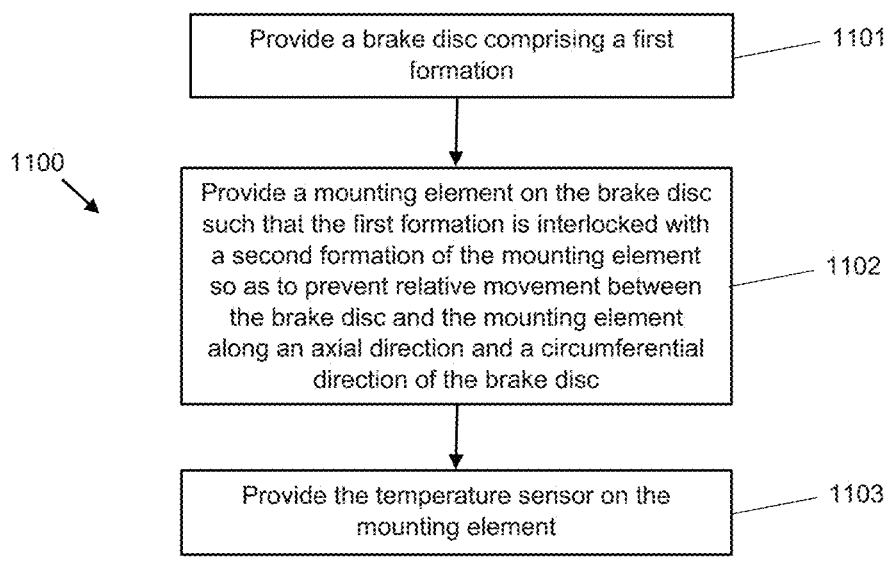
FIG. 11 is a flow chart of an example method for attaching a temperature sensor to a brake disc.

A method 1100 of attaching a temperature sensor to a brake disc for an aircraft brake pack is illustrated in FIG. 11. In block 1101 a brake disc comprising a first formation is provided. The first formation may be, e.g. a recess, a protrusion, a groove, a ridge, a hole, a notch, etc. The first formation may have any of the features described above in relation to FIGS. 8-10. Providing a brake disc comprising the first formation may comprise creating the first formation on or in the brake disc, by any suitable means. For example, in cases where the first formation extends into a surface of the brake disc (e.g. examples in which the first formation comprises a recess, groove, notch, hole etc.), creating the first formation can comprise cutting, grinding, drilling, or boring the first formation into the material of the brake disc. The first formation may be created as part of a manufacturing process of the brake disc, e.g. in cases where the first formation comprises a notch configured to receive a spline of a torque tube.

In block 1102 a mounting element is provided on the brake disc, such that the first formation is interlocked with a second formation of the mounting element so as to prevent relative movement between the brake disc and the mounting element along an axial direction and a circumferential direction of the brake disc. Providing the mounting element on the brake disc may comprise providing the mounting element on the brake disc at a predetermined location, and/or a predetermined orientation of the mounting element. Providing the mounting element on the brake disc may comprise inserting the first formation into the second formation and/or inserting the second formation into the first formation. Providing the mounting element on the brake disc may comprise creating a mechanical interlock between the first formation and the second formation, and thereby between the mounting element and the brake disc. Providing the mounting element on the brake disc may comprise attaching the mounting element to the brake disc using any suitable technique, e.g. bonding, riveting, bolting, etc. In particular examples in which the mounting element comprises a portion of cured adhesive material, providing the mounting element on the brake disc comprises applying uncured adhesive material to the surface of the first formation to create the second formation, e.g. in the manner described above in relation to FIG. 8.

In block 1103 the temperature sensor is provided on the mounting element. In some examples providing the temperature sensor on the mounting element comprises bonding the temperature sensor to the mounting element, e.g. using spray bonding or a ceramic epoxy adhesive. In particular examples in which the mounting element comprises a portion of cured adhesive material, providing the temperature sensor on the mounting element comprises contacting the temperature sensor with the uncured adhesive material and subsequently curing the adhesive material, e.g. in the manner described above in relation to FIG. 8. The temperature sensor may be provided on the mounting element at a preselected location such that wireless communication is possible between the temperature sensor and a relay antenna. For example, the temperature sensor may be provided on a surface of the mounting element which, when the brake disc is in the brake pack, faces a component of the brake pack on which the relay antenna is located.

Although the flow diagram in FIG. 11 shows a specific order of execution, the order of execution may differ from that which is depicted. For example, the order of execution of two or more blocks may be scrambled relative to the order shown. Also, two or more blocks shown in succession may be executed concurrently or with partial concurrence. All such variations are contemplated.

Figure 12:
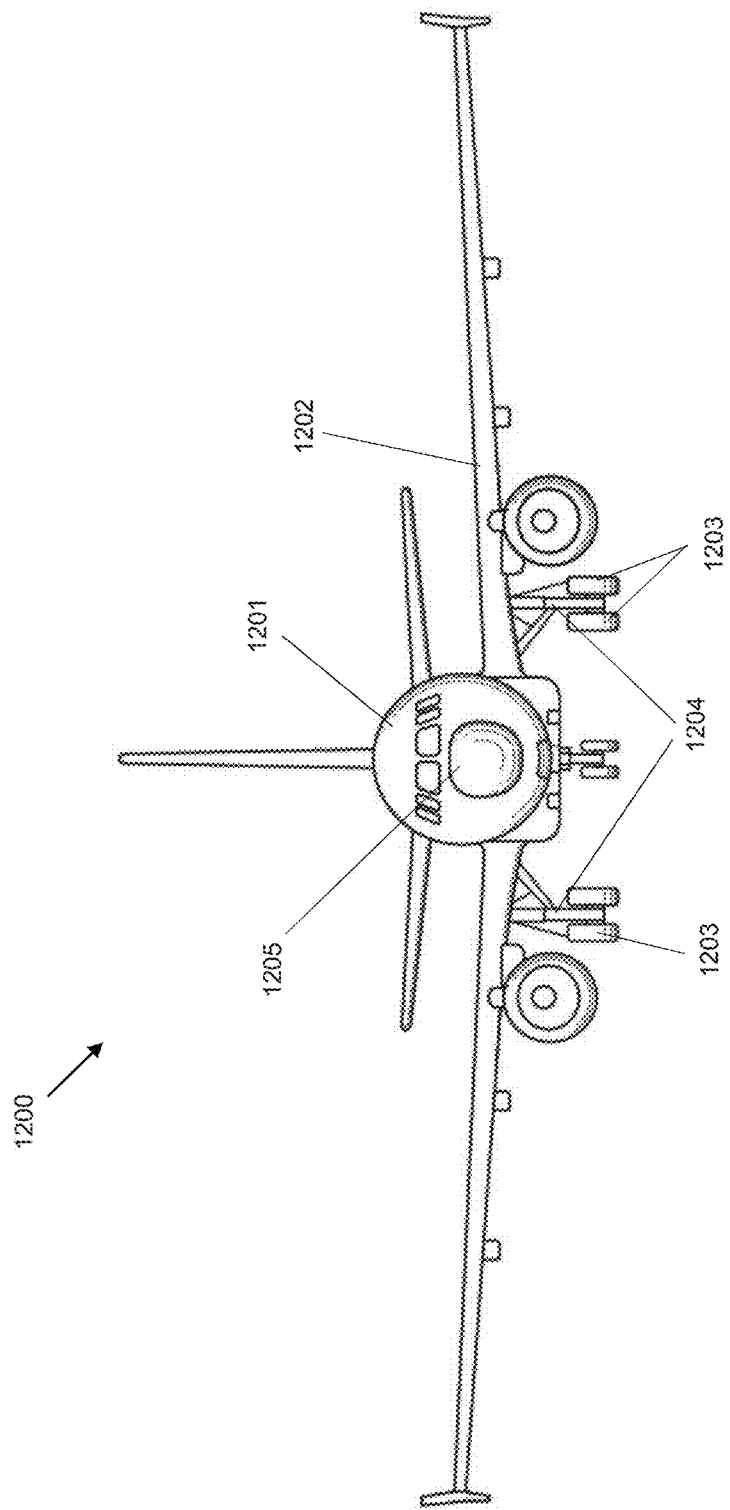
FIG. 12 is a schematic view of an example aircraft comprising a brake temperature sensing system according to an example.

FIG. 12 shows an example aircraft 1200 on which a brake temperature sensing system according to the examples (e.g. the brake temperature sensing system 100) is installed. It will be appreciated that brake temperature sensing systems as described above can equally be used on different aircraft, having different configurations of wheels, landing gear and so on, to the illustrated aircraft 1200.

The particular example aircraft 1200 comprises a fuselage 1201, wings 1202, and main landing gear 1204. Two wheels 1203 are attached to each main landing gear 1204. Each wheel 1203 has an associated brake (not visible), such as the brake 500 described above, for braking that wheel. Each brake comprises at least one sensor apparatus, e.g. the sensor apparatus 110 or the sensor apparatus 510 described above. The aircraft 1200 has one sensor apparatus per wheel, and therefore comprises four separate sensor apparatus. However, in other examples more than one sensor apparatus per wheel may be provided.

The aircraft 1200 further comprises two interrogation apparatus, each of which corresponds to and is configured to communicate with two sensor apparatus (i.e. the two sensor apparatus on a particular landing gear). In this example each interrogation apparatus is configured to transmit two different interrogation signals, one to each individual sensor apparatus on its landing gear, and is configured to receive two different measurement signals, one from each individual sensor apparatus on its landing gear. The interrogation apparatus may be configured to separately generate and process signals relating to each individual sensor apparatus on its landing gear, such that the interrogation apparatus effectively simultaneously performs the functions of four different interrogation apparatus. However, alternative examples are possible in which at least some of the signal processing and/or generation for the different sensor apparatus is combined by the interrogation apparatus. Each interrogation apparatus is located on an upper part of the same landing gear as its corresponding sensor apparatus (although alternative arrangements are possible in which one or more interrogation apparatus, or parts thereof, are located on a lower part of a landing gear). Each interrogation apparatus may be an interrogation apparatus 120 as described above. Alternative arrangements are possible in which an interrogation apparatus is provided in respect of each individual sensor apparatus. There may therefore be more than one interrogation apparatus associated with a given landing gear.

The aircraft 1200 further comprises an avionics system 1205, located in an avionics bay or compartment. In the particular example the avionics bay is in the nose of the aircraft below the cockpit, but it may be in a different location depending on the type of aircraft. The avionics system 1205 comprises the electronic systems associated with flying the aircraft, including airborne communication and navigation systems and flight control systems. The avionics system 1205 may comprise all of the electronics associated with communicating information to other parts of the aircraft 1200. Each interrogation apparatus is connected to the avionics system 1205 by a wired communications link over which data can be exchanged between the avionics system 1205 and the interrogation apparatus. For example, the avionics system 1205 may transmit, over the communications link, a request signal to the interrogation apparatus configured to cause the interrogation apparatus to obtain a temperature measurement (e.g. by the interrogation apparatus transmitting an interrogation signal to the sensor apparatus). When the interrogation apparatus has obtained a temperature measurement it may transmit, over the communications link, a reporting signal including or otherwise based on the obtained temperature measurement to the avionics system 1205.

Various alternative arrangements are possible for the interrogation apparatus. For example, each interrogation apparatus may be one or more of: attached to a landing gear 1204 on which the brake is mounted; attached to a wing 1202; attached to the fuselage 1201; and comprised in the avionics system 1205. Since, as discussed above in relation to the interrogation apparatus 120, a transceiver of an interrogation apparatus may be provided as a separate unit to a controller of that interrogation apparatus, it is possible for a first part of an interrogation apparatus to be installed at a first location on the aircraft and a second part of that interrogation apparatus to be installed at a second, different location on the aircraft.

The invention claimed is:

1. A brake disc assembly for use in an aircraft brake, the brake disc assembly comprising:
    a temperature sensor;
    a mounting element fixed directly to a brake disc and supporting the temperature sensor to attach the temperature sensor to the brake disc,
    wherein the brake disc comprises a recess in a circumferential surface of the brake disc,
    wherein the mounting element comprises a second formation shaped to be received by and interlock with the recess in the circumferential surface of the brake disc to prevent relative movement between the brake disc and the mounting element along an axial direction and a circumferential direction of the brake disc.

2. The brake disc assembly according to claim 1, wherein the recess comprises a notch configured to receive a spline on a torque tube of the brake pack, wherein the mounting element comprises a clip mounted to the notch and disposed between the notch and the spline, and the second formation comprises a section of the clip having an external profile shaped to match an internal profile of the notch.

3. The brake disc assembly according to claim 1, wherein the mounting element comprises a pin, the pin includes a stem received within the recess and forming the second formation, and the temperature sensor is attached to a head of the pin.

4. The brake disc assembly according to claim 3, wherein the brake disc comprises a notch configured to receive a spline on a torque tube, and the recess is in a base of the notch such that the head of the pin is adjacent the base of the notch.

5. The brake disc assembly according to claim 1, wherein the mounting element comprises adhesive material securing the temperature sensor to the mounting element, and the mounting element is secured by adhesive material to the recess.

6. The brake disc assembly according to claim 5, wherein the adhesive material comprises a ceramic epoxy material.

7. The brake disc assembly of claim 1, wherein the brake disc is a first brake disc in a plurality of brake discs in a brake stack, and the first brake disc is between two of the brake discs in the brake stack that rotate relative to the first brake disc.

8. An aircraft brake assembly comprising:
a torque tube having a radially outer circumferential surface with splines;
a brake disc having a radially inner circumferential surface with an annular array of notches, wherein the radially inner circumferential surface is configured to engage the radially outer circumferential surface of the torque tube and the notches are configured to receive the splines;
a mounting element fixed directly to the brake disc, wherein the mounting element is seated in one of the notches; and
a temperature sensor fixed to the mounting element.

9. The aircraft brake assembly of claim 8, further comprising a first antenna fixed to one of the splines received in the one of the notches to which is fixed the mounting element, and wherein the temperature sensor is configured to emit wireless signals with information of a temperature measured by the temperature sensor, and the first antenna is configured to receive the wireless signals emitted by the temperature sensor.

10. The aircraft brake assembly of claim 9, further comprising a second antenna mounted to a piston housing or an actuator housing attached to the torque tube, and a conductive wire mounted to the torque tube, electrically connecting the first and second antennae.

11. The aircraft brake assembly of claim 10, wherein the conductive wire is configured to relay the wireless signals receive by the first antenna to the second antenna.

12. The aircraft brake assembly of claim 8, wherein the mounting element comprises a pin including a stem and a head, wherein the stem is embedded into the one of the notches, and the temperature sensor is attached to the head.

13. The aircraft brake assembly of claim 8, wherein the mounting element includes adhesive material disposed between the one of the notches and the temperature sensor.

14. The aircraft brake assembly of claim 13, wherein the adhesive material comprises a ceramic epoxy material.

15. A method of attaching a temperature sensor to a brake disc for an aircraft brake, the method comprising:
providing a brake disc having a circumference with a recess;
providing a mounting element fixed directly to the brake disc such that the mounting element is interlocked with the recess to prevent relative movement between the brake disc and the mounting element along an axial direction and a circumferential direction of the brake disc; and
providing the temperature sensor on the mounting element.

16. The method according to claim 15, wherein providing the temperature sensor on the mounting element comprises bonding the temperature sensor to the mounting element.

17. The method according to claim 15, wherein the mounting element comprises a portion of cured adhesive material, wherein providing the mounting element on the brake disc comprises applying uncured adhesive material to the surface of the first formation to create the second formation, and wherein providing the temperature sensor on the mounting element comprises contacting the temperature sensor with the uncured adhesive material and subsequently curing the adhesive material.

18. The method of claim 15, wherein the brake disc is a first brake disc in a plurality of brake discs in a brake stack, and the first brake disc is between two of the brake discs in the brake stack that rotate relative to the first brake disc.

* * * * *